May 22, 1923.                    1,455,889
J. SCHWAB
AUTOMOBILE TUBE
Filed Aug. 1, 1922

INVENTOR
J. Schwab
BY
ATTYS

Patented May 22, 1923.

1,455,889

UNITED STATES PATENT OFFICE.

JOHN SCHWAB, OF WINNIPEG, MANITOBA, CANADA.

AUTOMOBILE TUBE.

Application filed August 1, 1922. Serial No. 578,956.

*To all whom it may concern:*

Be it known that I, JOHN SCHWAB, of the city of Winnipeg, in the Province of Manitoba, Canada, have invented certain new and useful Improvements in Automobile Tubes, of which the following is the specification.

The invention relates to improvements in automobile tubes and an object of the invention is to provide in combination with a tube having channels in the face thereof next the tire, means for admitting fresh air into the channels to prevent the over heating of the air in the channels, and the damaging by heat of the tire or tube.

With the above more important object in view the invention consists essentially in the arrangement and construction of parts hereinafter more particularly described and later pointed out in the appended claims, reference being had to the accompanying drawing in which:

In the drawing like characters of reference indicate corresponding parts in the several figures.

Figure 1:
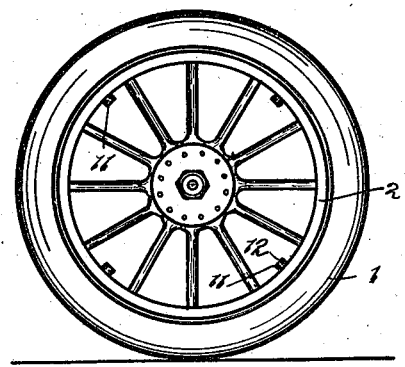
Fig. 1 is a side view of an automobile wheel equipped with my invention.
Figure 2:
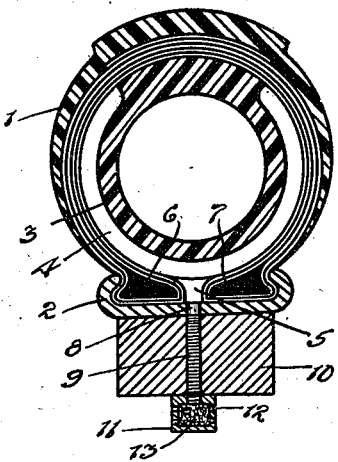
Fig. 2 is an enlarged detailed sectional view at 2—2′ Fig. 1.
Figure 3:
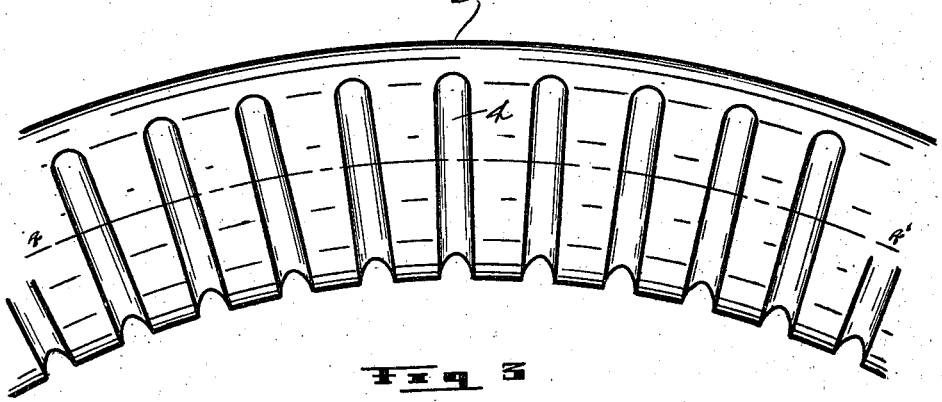
Fig. 3 is a side view of a portion of the tube.
Figure 4:
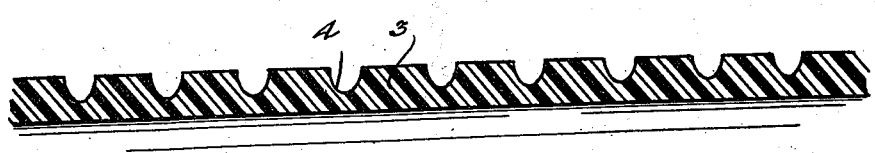
Fig. 4 is a sectional view through a portion of the tube.

The outer casing 1 of the automobile tire is of the usual conventional form and it is mounted in the customary manner on the metallic rim 2. Within the casing I locate a comparatively thick walled inflatable inner tube 3, the tube being preferably formed from what is known as cushioning rubber and being provided on its outer face with a plurality of circumferentially extending spaced grooves 4. The ends of the grooves are terminated so as to reserve the full thickness of the tube at the tread side of the same. A tube of this nature is fully shown and described in my copending application No. 552521, filed April 14th, 1922.

I have found that a tube of the nature, described in the aforesaid application, heats and in time may injure both the casing and the tube.

As hereinbefore intimated, the object of the present invention is to provide a means for introducing fresh air into the channels.

In a considerable number of instances it is found that there is a continuous clearance space 5 around the rim between the inner portions 6 and 7 of the casing and I utilize such a space to introduce fresh air into the various channels as this space crosses all the channels formed in the tube. In instances where there is not an existing clearance space it will be provided by shortening the inner edges of the portions 6 and 7 of the casing.

A number of suitably positioned holes 8 are formed in the rim, these communicating with the passage 5 and number of vent tubes 9 are screwed through the felly 10 of the wheel, these communicating with the respective openings 8. The inner ends of the tubes protrude within the felly and are provided with screw threaded caps 11, the caps being fitted with air inlet openings 12 which admit fresh or atmospheric air in to the tubes and consequently by way of the passage 5 to the various channels 4.

In order to prevent dust and dirt from entering the channels I have placed an absorbent material such as a sponge or ground cork, indicated at 13 in the caps. When this is dry the air will pass freely through the caps to the channels. However, should one run the wheel through mud or water the absorbent material will swell and close the openings in the caps.

In the drawing I have shown four tubes, but it will be understood that any desirable number can be used.

The fresh air admitted to the channels 4 will effectively prevent heating and consequently materially increase the life of both the tube and the casing.

What I claim as my invention is:

1. The combination with a wheel rim, a casing, and a tube within the casing and having channels in the face thereof next the casing, of means for introducing atmospheric air to the channels through the rim.

2. The combination with a wheel felly, rim, outer casing and tube, the said tube having channels in the outer face thereof next the casing, of vent tubes passing through the felly and communicating through the rim with the channels.

3. The combination with a wheel felly, rim, casing and tube, the said tube having spaced circumferentially directed channels formed in the side thereof next the casing and the channels connected by an air passage, of vent tubes passing through the felly and communicating through suitable openings provided in the rim with the air passage.

4. The combination with a wheel felly, rim, casing and tube, the said tube having spaced circumferentially directed channels formed in the side thereof next the casing and the channels connected by an air passage, of vent tubes passing through the felly and communicating through suitable openings provided in the rim with the air passage, perforated caps applied on the inner ends of the tubes and an absorbent material contained within the caps.

5. In a tire, the combination of a casing, an inner tube having suitable spaced channels formed in the outer wall thereof and passing from side to side and with the ends of the channels terminated so that no channel crosses the tread side of the tire and means for introducing air into said channels.

6. In a tire, the combination of a casing, an inner tube provided on the sides and opposite the tread with alternate portions of unequal thickness affording exterior channels extending transversely around the tube and means for introducing air into said channels.

7. In a tire, the combination with a casing of an inner tube of relatively thick material formed with a tread portion of uniform thickness throughout and opposite the tread portion with exterior channels to afford expansion clearance between the tube and the casing and means for introducing air into said channels.

8. In a tire, the combination of a casing, an inner tube provided with a tread portion of uniform thickness throughout and with exterior clearance channels on opposite sides of the channels and means for introducing air into said channels.

Signed at Winnipeg, this 19th day of July, 1922.

JOHN SCHWAB.

In the presence of—
GERALD S. ROXBURGH,
E. L. ARTHUR.